(12) United States Patent
Sun et al.

(10) Patent No.: US 11,573,294 B2
(45) Date of Patent: Feb. 7, 2023

(54) SWITCHED OPTICAL PHASED ARRAY BASED BEAM STEERING LIDAR

(71) Applicant: Litexel Inc., West Covina, CA (US)

(72) Inventors: Xiaochen Sun, Chino Hills, CA (US); Lingxuan Zhang, West Covina, CA (US)

(73) Assignee: Litexel Inc., West Covina, CA (US)

( * ) Notice: Subject to any disclaimer, the term of this patent is extended or adjusted under 35 U.S.C. 154(b) by 406 days.

(21) Appl. No.: 16/821,591

(22) Filed: Mar. 17, 2020

(65) Prior Publication Data
US 2021/0293934 A1 Sep. 23, 2021

(51) Int. Cl.
*H04B 10/00* (2013.01)
*G01S 7/481* (2006.01)
*G01S 7/4911* (2020.01)
*G01S 17/32* (2020.01)

(52) U.S. Cl.
CPC ........... *G01S 7/4815* (2013.01); *G01S 7/4911* (2013.01); *G01S 17/32* (2013.01)

(58) Field of Classification Search
CPC combination set(s) only.
See application file for complete search history.

(56) References Cited

U.S. PATENT DOCUMENTS

| | | | |
|---|---|---|---|
| 3,781,552 A | 12/1973 | Kadrmas | |
| 5,210,586 A | 5/1993 | Grage et al. | |
| 5,682,229 A | 10/1997 | Wangler | |
| 6,891,987 B2 | 5/2005 | Ionov et al. | |
| 7,969,558 B2 | 6/2011 | Hall | |
| 8,125,367 B2 | 2/2012 | Ludwig | |
| 8,675,181 B2 | 3/2014 | Hall | |
| 8,767,190 B2 | 7/2014 | Hall | |
| 9,753,351 B2 * | 9/2017 | Eldada | G01S 7/4817 |
| 9,964,833 B2 | 5/2018 | Eldada | |
| 9,983,297 B2 | 5/2018 | Hall et al. | |
| 2019/0391243 A1 * | 12/2019 | Nicolaescu | G01S 17/931 |
| 2021/0055625 A1 * | 2/2021 | Lajevardi | H01Q 3/36 |
| 2021/0112647 A1 * | 4/2021 | Coleman | H05B 47/11 |
| 2021/0181310 A1 * | 6/2021 | Lu | G01S 17/42 |
| 2021/0293934 A1 * | 9/2021 | Sun | G01S 7/4911 |
| 2022/0065997 A1 * | 3/2022 | Lo | G01S 7/4817 |
| 2022/0075077 A1 * | 3/2022 | Kato | G01S 7/4808 |
| 2022/0120908 A1 * | 4/2022 | Kato | G06T 7/00 |
| 2022/0128661 A1 * | 4/2022 | Wang | G02B 6/124 |

\* cited by examiner

*Primary Examiner* — Agustin Bello
(74) *Attorney, Agent, or Firm* — Chen Yoshimura LLP

(57) ABSTRACT

A switched optical phased array based beam steering LiDAR (light detection and ranging) system includes an integrated photonics optical phased array (OPA) that includes an optical switching network for selectively connecting a large number of 1D scanning (in a first direction or field-of-view) antenna arrays to a light source. Each array is configured to emit light in a predefined angle of a second direction or field-of-view and can be switched individually to connect to the light source. At any given time, the phase shifters of only one such array, i.e. the one that is switched to connect the light source, are actively adjusted by the control circuits, so that the active power consumption is greatly reduced. The LiDAR system also includes a photo sensor receiver, other control and signal processing circuits, and other necessary optical and mechanical components.

20 Claims, 4 Drawing Sheets

SWITCHED OPTICAL PHASED ARRAY BASED BEAM STEERING LIDAR

BACKGROUND OF THE INVENTION

Field of the Invention

The invention relates to a light detection and ranging (LiDAR) system that is based on an integrated photonics optical phased array (OPA) beam steering.

Description of Related Art

Radio wave phased arrays play important roles in modern communication, ranging and astronomy. Based on the same physics but a drastically different frequency range, chip scale optical phased array (OPA) has lately been drawing increasing attention for a wide range of applications from autonomous vehicle LiDAR (light detection and ranging), to free-space communication, to image projection. An optical phased array device is generally made of many antenna units which are arranged in one- or two-dimensional array and are individually or group tunable in phase and sometimes amplitude in order to form a specific output beam pattern through interference effect.

An on-chip optical phased array device based on integrated photonics often relies on photonic waveguides to transmit and distribute light to an array of photonic antennas. The photonic waveguides can be made on chip with many optical material systems such as silicon-on-insulator, doped silica, silicon nitride, indium phosphide, lithium niobate and etc. The use of waveguide and the CMOS like Si processing capability can significantly increase the complexity i.e. the number of the antennas (and associated phase tuning elements) therefore a large scale OPA can be practically realized and maybe commercialized.

Using an OPA to depth-range a target scene in two dimensions (2D) is usually accomplished by adjusting the phases of a 2D array of optical antennas to form a signal optical beam to illuminate a spot of the scene and to sequentially rotate the optical beam to scan the scene while measuring the distance by calculating the received reflected light at each spot. In order to form a low-divergence optical beam (i.e. small illuminated spot size) as well as minimal unwanted side lobes both demanded by many high resolution applications such as autonomous driving, the number of the antennas may be very large. For example, a beam width or beam divergence angle of 0.1 degree which is generally demanded by beam scanning in horizontal field-of-view in Level 4 or 5 autonomous driving requires an array of antennas spanning approximately 500 times of the wavelength of the optical signal which corresponds to hundreds of antennas in most OPA designs. Even if the beam scanning in vertical field-of-view generally requires much relaxed beam width such as 0.5 degree, corresponding to about 100 times of the wavelength, the whole antenna array could comprise several tens of thousands antennas and corresponding phase shifters. It introduces huge practical difficulties as it requires the phase shifters as well as the same number of controlling circuits work simultaneously which can generate lots of heat and control complexity. A typical thermo-optics or free-carrier absorption based phase shifters requires about 10 mW for it shifting, which can be a good estimate of the averaged power per phase shifter which requires shifting phase to any certain value within 0 to $2\pi$ for due to random initial phase error commonly met in an integrated photonics OPA. Therefore the power consumption of an above-mentioned OPA can be as high as 50-100 W (also considering contribution from controlling circuits) which can be a great challenge for cooling especially consider the wide operating temperature range required by automobile standards.

A method to address the above issue is to use multiple OPA chips or devices like the one described in U.S. Pat. No. 9,753,351 B2 and combine them to realize scanning in two directions (or two fields of view). If multiple OPAs are arranged to emit light to different angles from the rotation plane that the one dimension (or field of view) phased array scanning occurs, such design is not scalable in terms of both cost and system complexity as the number of the scanning points or the resolution is scaled with the number of pairs of individual lasers and receivers. If multiple OPAs are sequentially connected in order to scan the emitted light in two dimensions (or fields or views), the optical path interconnect design from the output of a first OPA to the input of a second OPA can be very complicated as the output light of the first OPA changes directions which cannot be easily coupled into the generally fixed input of the second OPA therefore most likely at least one moving component is required or other types of free-space scanning approach is adopted. This sequentially connected OPAs scheme, although mentioned in both U.S. Pat. No. 9,964,833 B2 and U.S. Pat. No. 9,753,351 B2, is not clearly explained in the implementation of above-mentioned optical coupling between two OPAs.

Another method takes advantage the fact that an OPA antenna array forms a beam pointing at different angles with different wavelength. A 1D scanning OPA is in principle able to scan the other direction or field-of-view by tuning the wavelength of its input light source. It however requires a precise tunable laser which is generally very costly to be reliably deployed in a system operating in wide temperature range required by automobile standards.

SUMMARY

A light detection and ranging (LiDAR) system according to embodiments of the present invention includes an integrated photonics optical phased array (OPA) that includes a large number of 1D scanning (in a first direction or field-of-view) antenna arrays such that each array emits light in a different angle of a second direction or field-of-view and may be switched individually to connect to the same light source. At any given time, the phase shifters of only one such array that is switched to connect the light source are actively adjusted by controlling circuits such that the active power consumption is greatly reduced. The LiDAR system in some embodiment also includes a light source, a photo sensor receiver, other controlling and signal processing circuits as well as other necessary optical and mechanical components.

In one aspect, the present invention provides a LiDAR system which includes: a transmitter configured to generate a light beam; and a receiver configured to detect light input upon it; wherein the transmitter includes a light source, an optical phased array, and control circuitry; wherein the optical phased array includes: an optical switching network including at least one optical switch, the optical switching network having an input and a plurality of outputs, wherein the input of the optical switching network is coupled to the light source to receive light from the light source, and wherein the optical switching network is configured to output the light to a selected one of the plurality of outputs of the optical switching network; a plurality of beam splitters, wherein each beam splitter has one input and a plurality of outputs and is configured to split a light input into its input into a plurality of simultaneous output lights at the plurality of outputs, wherein each beam splitter is coupled at its input to a corresponding one of the plurality of outputs of the optical switching network; a plurality of phase shifter arrays, each phase shifter array including a plurality of phase shifters, wherein each phase shifter array is coupled to a corresponding beam splitter, with the plurality of phase shifters in the phase shifter array coupled respectively to the plurality of outputs of the corresponding beam splitter, and wherein different phase shifter arrays are coupled to different corresponding beam splitters; and a plurality of antenna arrays, each antenna array including a plurality of antennas, wherein each antenna in each antenna array is coupled to a corresponding phase shifter in a corresponding phase shifter array, wherein within each antenna array, all antennas are configured to emit light in a same beam direction in a Y-Z plane, where Z is a direction perpendicular to a plane of the optical phased array and Y is a direction of light propagation within the antennas, and wherein different antenna arrays are configured to emit light in different beam directions in the Y-Z plane; wherein the control circuitry is coupled to and configured to control the optical switching network to sequentially output the light to the selected ones of the plurality of outputs of the optical switching network and thereby to sequentially output the light to selected phase shifter arrays and corresponding antenna arrays; and wherein the control circuitry is further coupled to the plurality of phase shifter arrays, and configured to control the phase shifters of each selected phase shifter array to control a direction of constructive interference of the light beams emitted by the antenna array coupled to the selected phase shifter array, wherein the direction of constructive interference is controlled to rotate in an X-Z plane, where X is a direction perpendicular to both Y and Z.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
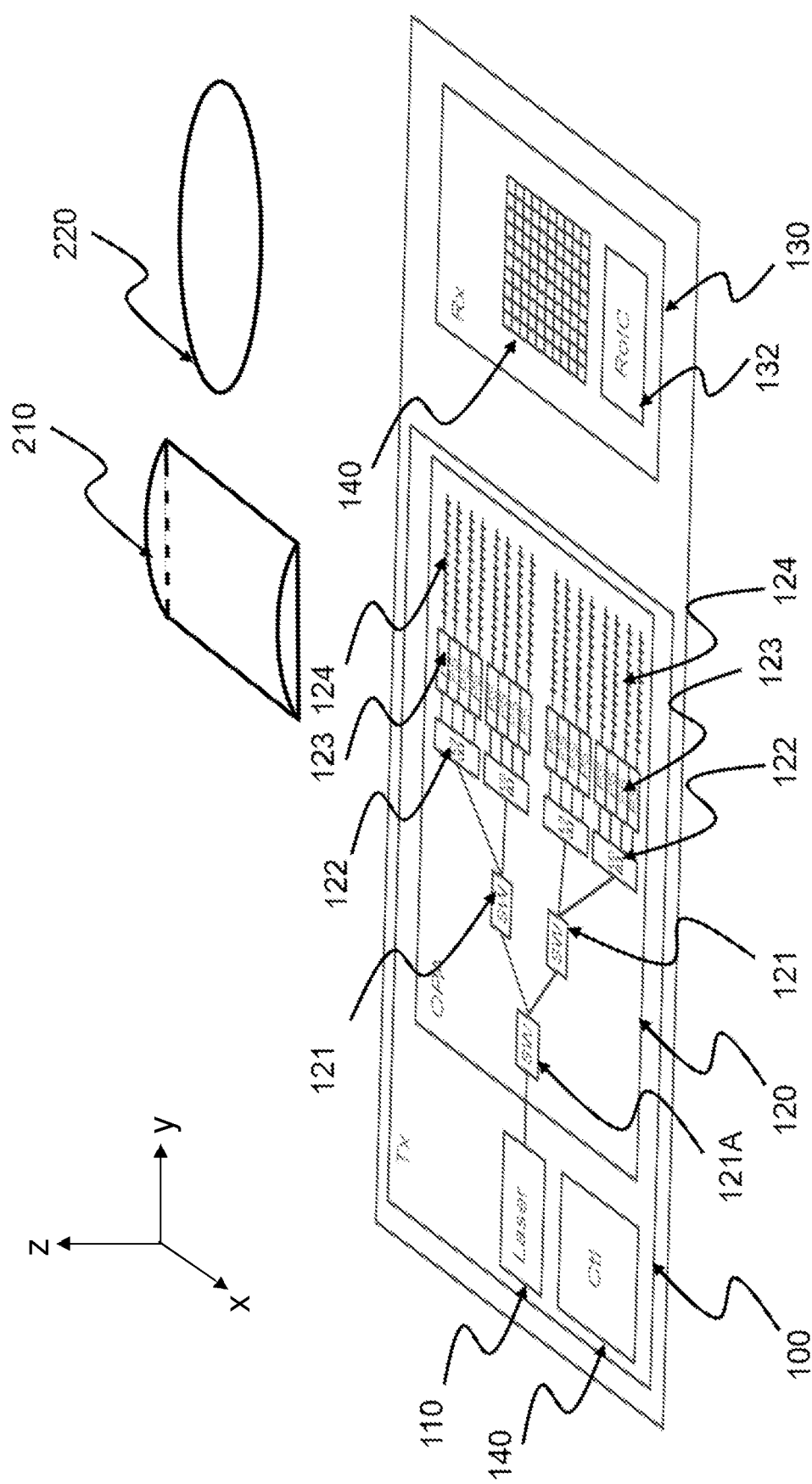
FIG. 1 is a schematic design of a LiDAR system according to an embodiment of the present invention.

A light detection and ranging (LiDAR) system according to an embodiment of the present invention is schematically shown in FIG. 1. The system includes: a transmitter 100 and a receiver 130; two optical lens systems 210 and 220; and physical and interfacing structures that are not shown in the figure.

The transmitter 100 includes:

a light source 110, including but not limited to at least one of a semiconductor laser, a solid-state laser, or a fiber laser;

at least one optical phased array (OPA) 120, which may be implemented in the form of a bare-die chip or a pre-packaged device including photonic integrated circuits on a semiconductor material platform including silicon (Si), particularly Si-on-insulator, $SiO_2$, InP, GaAs, or $LiNbO_3$;

control circuitry, including one or a plurality of control integrated circuits 140 which may be a part of the OPA chip or standalone chips;

and optional optical coupling components such as lenses (not shown in the drawings) for efficiently coupling light from the light source 110 to the OPA 120, as well as physical structures (not shown in the drawings) to hold the above components together.

In the OPA chip 120, there are at least one optical switch 121 which may be implemented by a waveguide-based photonic structure such as a Mach-Zehnder interferometer, a micro ring, a multi-mode interferometer, etc. A typical optical switch structure includes at least one input and at least two outputs such that one of the outputs may be chosen by external control circuits 140 to transmit light coming from the input, by mechanisms such as thermo-optic effect, electro-refractive effect, phase changing effect, free carrier electroabsorption effect, or electro-absorption effect. More than one optical switches 121 may be connected in cascade or stages to form an optical switching network to realize more than two outputs. The input of the optical switching network (i.e., the input of the first stage optical switch 121A) may include an optical coupler that can reduce the coupling loss from the light source 110 through the assistance of optional external optical coupling components.

The OPA chip 120 further includes at least one beam splitter 122 for each of the output of the optical switching network (i.e., the output of the final stage optical switches 121). Each beam splitter 122 splits an input light into a plurality of simultaneous outputs, and may be made by one or a plurality of waveguide-based photonic structures such as directional couplers, Y-junctions, multi-mode interferometers, or micro rings. Each beam splitter 122 connects to an output of a final stage optical switch such that each beam splitter 122 may be chosen to connect to the light source 110 through the optical switching network.

The OPA chip 120 further includes at least one array of phase shifters 123 and at least one corresponding array of waveguide-based antennas 124. Each array of phase shifters and corresponding antennas connects to one of the outputs of a beam splitter 122. Each array includes a plurality of waveguide-based phase shifters 123 and a plurality of waveguide-based antennas 124, where each antenna is coupled to one corresponding phase shifter.

The control circuits 140 are used to supply power to and control the operation of the light source 110 and the OPA 120 as well as to provide input/output (I/O) functions.

The receiver 130 includes:

one photo sensor 140, which may be implemented in the form of bare-die chip or pre-packaged device which is formed of a 1D or 2D array of at least one photo sensitive pixels; and one read-out circuit such as integrated circuit 132 which may be a part of the sensor array chip or a standalone chip.

The read-out circuit 132 is used to read photo-generated current or voltage signal, amplify the signal and calculate the distance values of all sensor pixels and to provide control and I/O functions.

The optical lens system 210 includes at least one optical lens and optionally other optical components such as filters and polarizers. The optical lens system 210 is used to shape the output light of the OPA 120 for better collimation or divergence properties the application requests. A typical configuration of the system 210 includes a cylindrical lens which reduces the beam divergence of the arrays of gratings antennas in one field-of-view direction (e.g., in the Y-Z plane, Z being the direction perpendicular to the plane of the OPA chip) while keeping the formed beam unchanged in the other field-of-view direction (e.g., in the X-Z plane). The optical lens system 210 may be omitted in some applications.

The optical lens system 220 includes at least one optical lens and optionally other optical components such as filters and polarizers. The optical lens system 220 is used to increase the effective light receiving aperture for large retuned optical signal in the photo sensor 140. The optical lens system 220 may also serve to image the target scene when the photo sensor 140 has an array of pixels.

Figure 2:
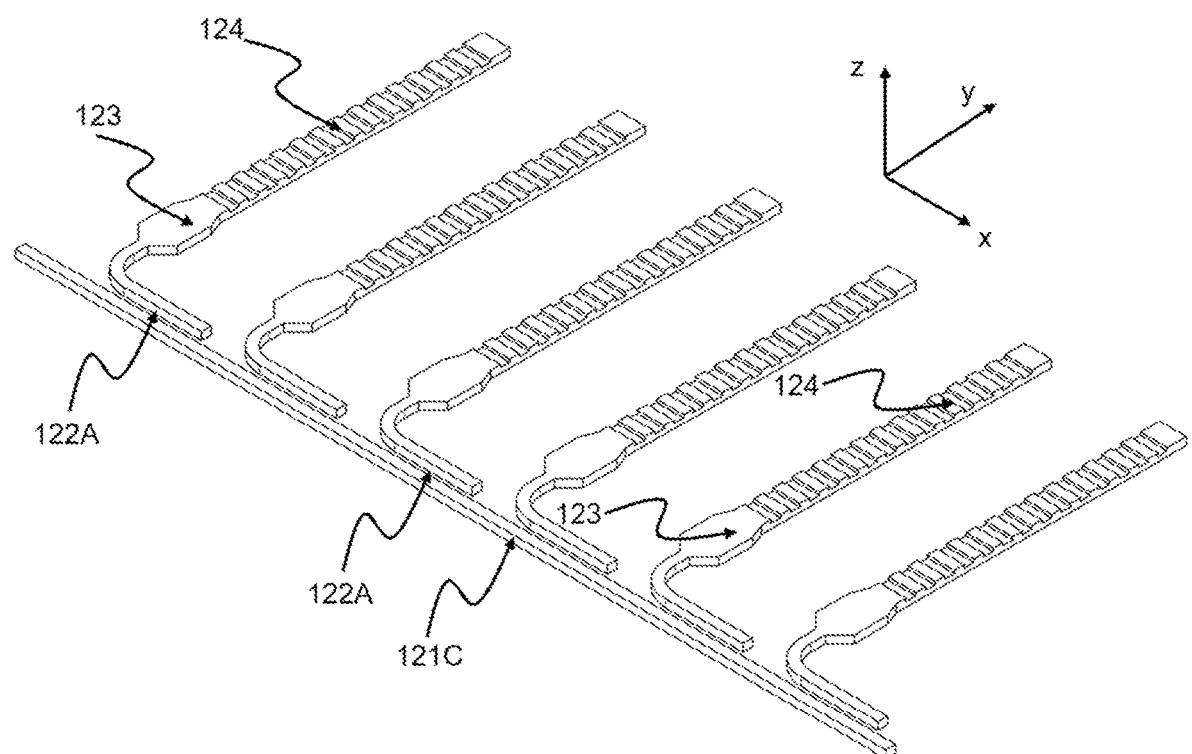
FIG. 2 is a schematic drawing of part of an 1D scanning antenna array of the LiDAR system of FIG. 1.

One exemplary design of an array of phase shifters and antennas is schematically shown in FIG. 2. In this particular design, the beam splitter 122 is realized by an array of directional couplers 122A, each of which couples a designated percentage of light to the phase shifter 123 from the bus waveguide 121C which is connected to the output of an optical switch 121.

The phase shifter 123 in FIG. 2 may be made by a section of waveguide that is electrically connected to external circuits to vary optical phase in the waveguide section by mechanisms such as thermo-optic effect, electro-refractive effect, phase changing effect, free carrier electroabsorption effect, or electro-absorption effect. The phase shifter 123 are electrically connected to internal or external driver circuits 140 through metal traces, metal bond pads and wire bonds (not drawn) which are well established on-chip or inter-chip connection techniques.

The antenna 124 may be realized by a 1D grating structure which is made of a plurality of periodically or non-periodically distributed waveguide sections along its light propagation direction (the Y direction in this example) with at least two different cross section structures (the cross-section being a section viewed along a direction perpendicular to the light propagation direction, e.g. along the X direction in this example). The different cross section structures result in different optical modes in the waveguide leading to a grating effect. The waveguide cross section difference which produces the mode size difference may be made by a variety of methods. It may be made by depositing at least one additional layer of at least one material the same as or different from the core material of the original waveguide onto the top surface of the waveguide core or onto a layer of top cladding material followed by patterning the deposited at least one additional layer to form a plurality of periodically or non-periodically distributed structures. It may also be made by partially or completely etching away the material from the entire or a part of the top surface of the waveguide core or from a layer of top cladding material through a patterned masking material such as photoresist, dielectric film, and metal film.

Figure 3:
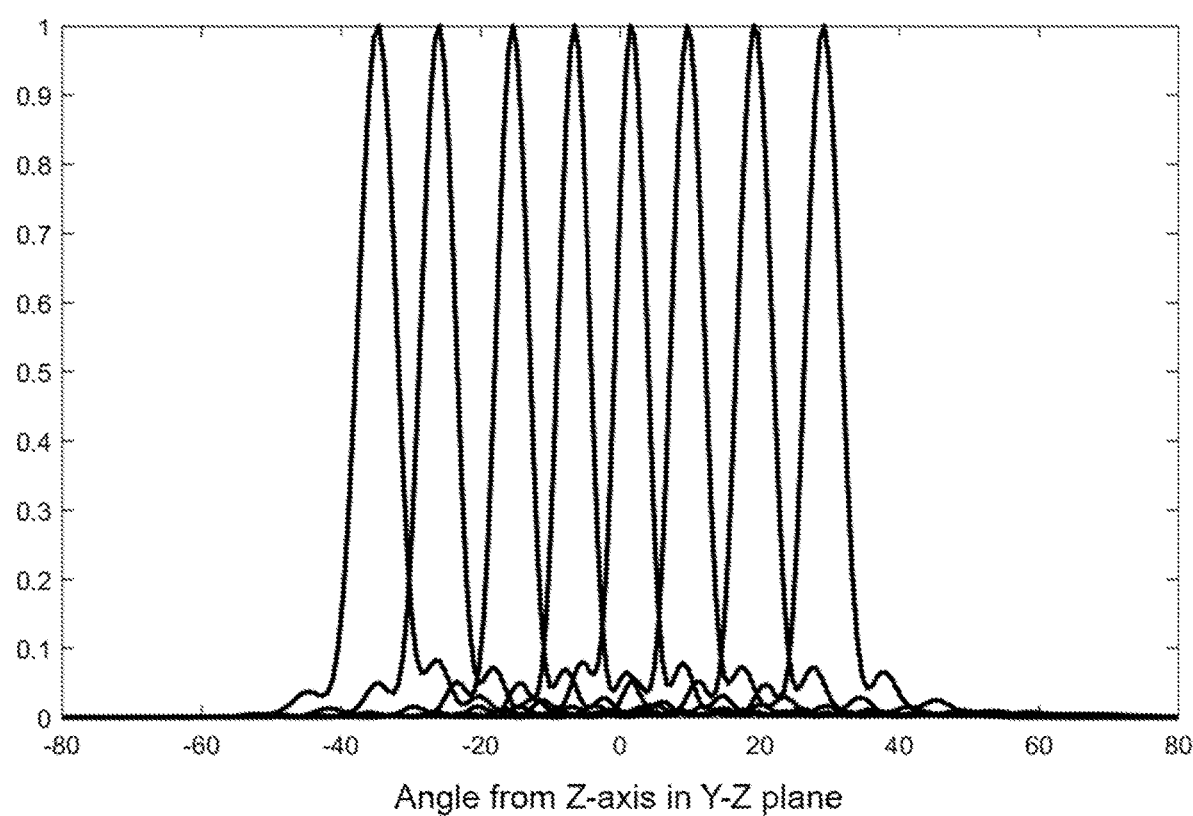
FIG. 3 shows examples of eight calculated far field patterns in the Y-Z plane, shown collectively in one figure, with eight different antenna grating designs for eight different beam directions.

The emitted optical beam direction in the Y-Z plane from a grating antenna 124, i.e. as defined by the angle of a projection of the emitted beam in the Y-Z plane relative to the Z-axis, is determined by a combination of the optical mode size difference and the grating period (for periodic grating design) or the distance distribution of these different-mode-size sections (for non-periodic grating design) in the grating antenna 124. The direction of the beam in the Y-Z plane is not affected by the phase shifters. In other words, the direction of the beam in the Y-Z plane is fixed after the device is manufactured. The plurality of antennas 124 are configured such that within each array of the antennas 124 (each array including the antennas coupled to a same beam splitter 122), the antennas have the same beam direction in the Y-Z plane; but different arrays of antennas (i.e. arrays coupled to different beam splitters 122) may have different beam directions in the Y-Z plane. Preferably, the plurality of antenna arrays are configured such that they have different beam directions in the Y-Z plane that cover a desired angular range at desired intervals. FIG. 3 shows eight calculated far field patterns in the Y-Z plane, drawn collectively in one figure, with eight different such grating designs resulting in eight different beam directions. This method can be readily scaled to more beam directions for finer angular resolution and wider angular range. During the OPA operation, the control circuits 140 may drive the appropriate optical switches 121 and route the input light through one of the arrays of antennas (coupled to a same beam splitter 122) at a given time. The antennas 124 in each array of antennas all emit light in a same designated direction in the Y-Z plane. By switching and routing the light signal to different arrays of antennas sequentially, the OPA chip effectively steers the output light in the Y-Z plane sequentially.

Figure 4:
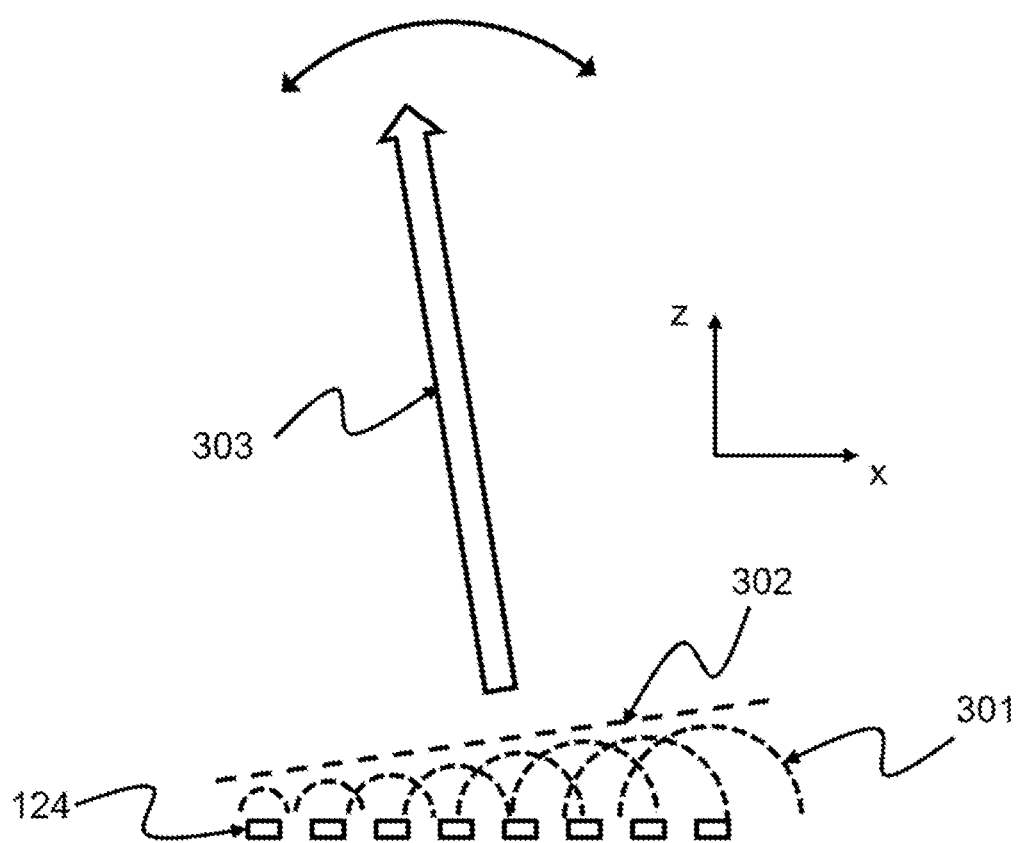
FIG. 4 is a schematic drawing explaining the mechanism of an optical phased array.

The steering of the output light in the other plane, namely the X-Z plane, is achieved by the optical interference within an array of antennas 124, i.e. based on the mechanism of OPA. The mechanism of OPA is illustrated in FIG. 4. Within an antenna array, each antenna emits a light, which is divergent in the X-Z plane (i.e. when projected on the X-Z plane), with almost the same wave front 301. These wave fronts 301 of different antennas in the same array interfere with each other to form the final far-field pattern of the antenna array. The phase of the wave front of the light emitted by each antenna 124 may be adjusted by its associated phase shifter 123 such that these wave fronts interfere constructively in one particular direction 303, i.e. forming a nearly flat overall beam front 302, but non-constructively in other directions. The resulting far field signal is a collimated beam in the direction of the constructive interference. In practice, the single-direction constructive interference cannot be ideally accomplished due to array design limitations and fabrication errors, so there are small portions of light in other directions forming a background. By dynamically controlling the phase shifters of an antenna array, this direction of constructive interference 303 may be rotated in the X-Z plane (i.e. the projection of this direction in the X-Z plane is rotated) to accomplish beam steering.

In the above embodiment, each array of antennas coupled to a same beam splitter 122 may be deemed a one-dimensional (1D) antenna array, and the plurality of such 1D antenna arrays form a two-dimensional (2D) antenna array. Here, the term "dimension" refers to the beam steering direction rather than the physical layout of the antennas. I.e., the 2D antenna array does not mean that the antennas are physically arranged in a 2D array (in fact, in the example shown in FIG. 1, all antennas in the 2D antenna arrays are physically arranged in a 1D array). With a combination of the optical switching-enabled beam steering in the Y-Z plane and the OPA-enabled beam steering in the X-Z plane, 2D beam steering can be achieved. This method greatly reduces power consumption compared to a full 2D phase-adjusting OPA because at any giving time, only the phase shifters in a 1D antenna array are powered and adjusted. The addition of the optical switch requires more power, however, the number of the actively powered and controlled optical switches is log 2(N) when a binary tree switch network is used. The power consumption of an optical switch is comparable to that of a phase shifter. Therefore, when a large number of antennas $N^2$ is required, the overall power consumption of this switching plus 1D OPA approach can be orders of magnitude smaller than a 2D OPA approach. This key advantage enables very large scale OPA-based beam steering LiDAR products which until now are not realized in practice.

It will be apparent to those skilled in the art that various modification and variations can be made in the OPA-based beam steering LiDAR and related method of the present invention without departing from the spirit or scope of the invention. Thus, it is intended that the present invention cover modifications and variations that come within the scope of the appended claims and their equivalents.

What is claimed is:

1. A light detection and ranging (LiDAR) system comprising:
    a transmitter configured to generate a light beam; and
    a receiver configured to detect light input upon it;
    wherein the transmitter includes a light source, an optical phased array, and control circuitry;
    wherein the optical phased array includes:
        an optical switching network including at least one optical switch, the optical switching network having an input and a plurality of outputs, wherein the input of the optical switching network is coupled to the light source to receive light from the light source, and wherein the optical switching network is configured to output the light to a selected one of the plurality of outputs of the optical switching network;
        a plurality of beam splitters, wherein each beam splitter has one input and a plurality of outputs and is configured to split a light input into its input into a plurality of simultaneous output lights at the plurality of outputs, wherein each beam splitter is coupled at its input to a corresponding one of the plurality of outputs of the optical switching network;
        a plurality of phase shifter arrays, each phase shifter array including a plurality of phase shifters, wherein each phase shifter array is coupled to a corresponding beam splitter, with the plurality of phase shifters in the phase shifter array coupled respectively to the plurality of outputs of the corresponding beam splitter, and wherein different phase shifter arrays are coupled to different corresponding beam splitters; and
        a plurality of antenna arrays, each antenna array including a plurality of antennas, wherein each antenna in each antenna array is coupled to a corresponding phase shifter in a corresponding phase shifter array, wherein each antenna is configured to emit light in a beam direction in a Y-Z plane that is independent of the corresponding phase shifter and independent of a physical location of the antenna, where Z is a direction perpendicular to a plane of the optical phased array and Y is a direction of light propagation within the antennas, wherein within each antenna array, all antennas are configured to emit light in a same beam direction in the Y-Z plane, and wherein different antenna arrays are configured to emit light in different beam directions in the Y-Z plane;
    wherein the control circuitry is coupled to and configured to control the optical switching network to sequentially output the light to the selected ones of the plurality of outputs of the optical switching network and thereby to sequentially output the light to selected phase shifter arrays and corresponding antenna arrays; and
    wherein the control circuitry is further coupled to the plurality of phase shifter arrays, and configured to control the phase shifters of each selected phase shifter array to control a direction of constructive interference of the light beams emitted by the antenna array coupled to the selected phase shifter array, wherein the direction of constructive interference is controlled to rotate in an X-Z plane, where X is a direction perpendicular to both Y and Z.

2. The LiDAR system of claim 1, further comprising an optical lens system including one or more optical lenses, configured to shape the light beam generated by the transmitter and to shape reflected light from a target and direct the reflected light to the receiver.

3. The LiDAR system of claim 1, wherein the light source is a semiconductor laser, a solid-state laser, or a fiber laser.

4. The LiDAR system of claim 1, wherein the optical phased array includes a bare-die chip or a pre-packaged device including photonic integrated circuits on a semiconductor material platform.

5. The LiDAR system of claim 1, wherein the transmitter further includes an optical coupling components configured to couple light from the light source to the optical phased array.

6. The LiDAR system of claim 1, wherein each of the least one optical switch of the optical switching network is a waveguide-based photonic structure.

7. The LiDAR system of claim 1, wherein the optical switching network includes a plurality of optical switches arranged in a cascade or multiple stages.

8. The LiDAR system of claim 1, wherein the beam splitters, the phase shifters, and the antennas are waveguide-based photonic structures.

9. The LiDAR system of claim 1, wherein the control circuitry is configured to supply power to and control the light source and the optical phased array.

10. The LiDAR system of claim 1, wherein the receiver includes at least one photo sensor formed of a bare-die chip or pre-packaged device, and a read-out circuit.

11. The LiDAR system of claim 1, wherein each of the plurality of beam splitters includes an array of directional couplers, each directional coupler coupling a fraction of light from a bus waveguide which is coupled to one output of the optical switch network to one of the phase shifters.

12. The LiDAR system of claim 1, wherein each antenna of the plurality of antenna arrays includes a one-dimensional grating structure which includes a plurality of periodically or non-periodically distributed waveguide sections along its light propagation direction, with at least two different cross section structures in a cross-section viewed along a direction perpendicular to the light propagation direction.

13. A light detection and ranging (LiDAR) system comprising:
    a transmitter configured to generate a light beam; and
    a receiver configured to detect light input upon it;
    wherein the transmitter includes a light source, an optical phased array, and control circuitry;
    wherein the optical phased array includes:

an optical switching network including at least one optical switch, the optical switching network having an input and a plurality of outputs, wherein the input of the optical switching network is coupled to the light source to receive light from the light source, and wherein the optical switching network is configured to output the light to a selected one of the plurality of outputs of the optical switching network;

a plurality of beam splitters, wherein each beam splitter has one input and a plurality of outputs and is configured to split a light input into its input into a plurality of simultaneous output lights at the plurality of outputs, wherein each beam splitter is coupled at its input to a corresponding one of the plurality of outputs of the optical switching network;

a plurality of phase shifter arrays, each phase shifter array including a plurality of phase shifters, wherein each phase shifter array is coupled to a corresponding beam splitter, with the plurality of phase shifters in the phase shifter array coupled respectively to the plurality of outputs of the corresponding beam splitter, and wherein different phase shifter arrays are coupled to different corresponding beam splitters; and a plurality of antenna arrays, each antenna array including a plurality of antennas, wherein each antenna in each antenna array is coupled to a corresponding phase shifter in a corresponding phase shifter array, wherein each antenna of the plurality of antenna arrays includes a one-dimensional grating structure which includes a plurality of periodically or non-periodically distributed waveguide sections along its light propagation direction, with at least two different cross section structures in a cross-section viewed along a direction perpendicular to the light propagation direction, wherein the light emitted by each antenna has a beam direction in a Y-Z plane that is independent of the corresponding phase shifter and that is determined by a combination of an optical mode size difference and either a grating period of the periodically distributed waveguide sections or a distance distribution of the non-periodically distributed waveguide sections of the antenna, where Z is a direction perpendicular to a plane of the optical phased array and Y is a direction of light propagation within the antennas, wherein within each antenna array, all antennas are configured to emit light in a same beam direction in the Y-Z plane, and wherein different antenna arrays are configured to emit light in different beam directions in the Y-Z plane;

wherein the control circuitry is coupled to and configured to control the optical switching network to sequentially output the light to the selected ones of the plurality of outputs of the optical switching network and thereby to sequentially output the light to selected phase shifter arrays and corresponding antenna arrays; and wherein the control circuitry is further coupled to the plurality of phase shifter arrays, and configured to control the phase shifters of each selected phase shifter array to control a direction of constructive interference of the light beams emitted by the antenna array coupled to the selected phase shifter array, wherein the direction of constructive interference is controlled to rotate in an X-Z plane, where X is a direction perpendicular to both Y and Z.

14. The LiDAR system of claim 13, further comprising an optical lens system including one or more optical lenses, configured to shape the light beam generated by the transmitter and to shape reflected light from a target and direct the reflected light to the receiver.

15. The LiDAR system of claim 13, wherein the optical phased array includes a bare-die chip or a pre-packaged device including photonic integrated circuits on a semiconductor material platform.

16. The LiDAR system of claim 13, wherein each of the least one optical switch of the optical switching network is a waveguide-based photonic structure.

17. The LiDAR system of claim 13, wherein the optical switching network includes a plurality of optical switches arranged in a cascade or multiple stages.

18. The LiDAR system of claim 13, wherein the beam splitters, the phase shifters, and the antennas are waveguide-based photonic structures.

19. The LiDAR system of claim 13, wherein the receiver includes at least one photo sensor formed of a bare-die chip or pre-packaged device, and a read-out circuit.

20. The LiDAR system of claim 13, wherein each of the plurality of beam splitters includes an array of directional couplers, each directional coupler coupling a fraction of light from a bus waveguide which is coupled to one output of the optical switch network to one of the phase shifters.

* * * * *